April 5, 1949.  J. A. LAND  2,466,247
PIPE HANGER
Filed March 14, 1947.
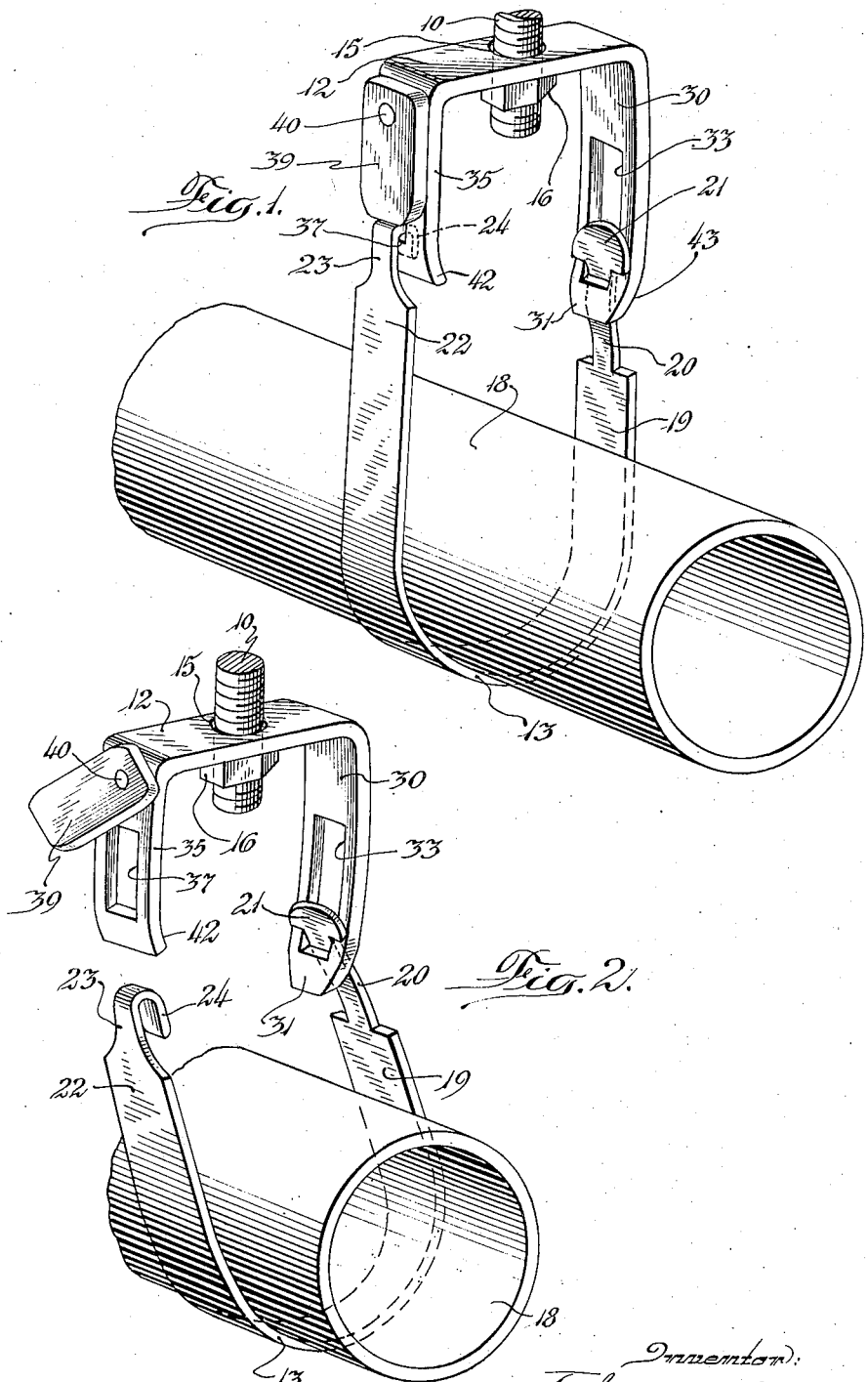
Inventor:
John A. Land
By Stevens & Batchelor
Attorneys Patented Apr. 5, 1949

2,466,247

UNITED STATES PATENT OFFICE 2,466,247

PIPE HANGER

John A. Land, Evergreen Park, Ill.

Application March 14, 1947, Serial No. 734,725

2 Claims. (Cl. 248—62)

My invention relates to hangers employed for the suspension of steam or water pipes from the ceilings of basements and like places. Such hangers as have come to my attention require bolts or other fastening means to be applied or adjusted for the proper suspension of the pipe, making the task a tedious or more or less difficult one, because the pipe must be held while the hanger is secured or adjusted. It is therefore one object of the present invention to provide a hanger which is connected more or less in the manner of a coupling, permitting the connection to be made quickly.

Another object is to provide a hanger which has no bolts or other separate fastening means of its own to be handled, taken apart or screwed together, relieving the workman of labor, special care or fatigue in this respect.

An additional object is to design a hanger for the above purpose which is simple, strong and reliable.

With the above objects in view, and any others which may suggest themselves from the description to follow, a better understanding of the invention may be had by reference to the accompanying drawing, in which—

Fig. 1 is a perspective view, showing the hanger in the closed position; and

Fig. 2 is a similar view showing it open.

Some forms of pipe hangers receive their support from a long screw depending from the ceiling, and specific reference to the drawing shows such a screw at 10. The novel hanger is composed of two units, one being a keeper 12 and the other a cradle 13. The keeper is made with a central opening 15 in its top for the free downward passage of the screw 10, to receive a securing nut 16. The height of the hanger may thus be varied by turning the nut 16 in one or the other direction.

As indicated, the cradle 13 is designed to form a receptacle for the pipe 18. One arm 19 of the cradle is reduced with a neck 20 which terminates with a T-shape head 21. The other arm 22 is reduced with a stem 23 which is bent inwardly to form a hook 24.

The keeper 12 is in the form of a square arch, with one leg made longer than the other. The longer leg is indicated at 30, the same being somewhat tapered at its lower end, as indicated at 31. The leg 30 is made with a vertically elongated slot 33. The shorter leg 35 of the keeper is also made with vertically elongated slot 37, the same being shorter than the slot 33 of the leg 30.

A lug 39 is applied to the outer face of the leg 35, the upper part of the lug being secured to the leg at a medial point by a slightly loose rivet 40. The leg 39 depends to a point a short distance above the lower end of the slot 37; and the corners of the lug are rounded as shown to make a smooth appearance. The lower end portions of the legs 30 and 35 are curved somewhat toward each other, as indicated at 42 and 43.

Before the hanger is applied to the pipe, its keeper 12 is freely mounted on the screw 10, whereby to be supported by the nut 16. The cradle 13 is handled separately from the keeper 12, for facility in seating the pipe therein. Since the keeper 12 is loose in respect to the screw 10, it may be swung sideways to permit the head 21 of the cradle to pass into the slot 33 and cause the cradle to become linked to the keeper on the corresponding side, as indicated in Fig. 2, it being understood that the width of the cradle neck 21 is so much less than that of the slot 33 to permit the above connection to be made with facility. The lug 39 of the keeper is now swung aside, as indicated in the same figure, and the assembly of the cradle 13 with the pipe raised in the direction of the keeper leg 35 until the hook 24 enters the slot 35 and engages the lower end thereof as suggested in Fig. 1. The lug 39 is now swung down in the manner of a latch to assume a position directed over the hook 24, completing the connection of the hanger.

It will be evident that the novel hanger is an improvement over old types from several points of view. First, the keeper may be mounted for support from the ceiling screw 10 without requiring the pipe to be supported or adjusted, so that no further concern need be had about supporting the keeper. Further, the assembly of the pipe of the cradle 13 requires only a brief period for its support, as it is a comparatively easy matter to turn the keeper while it is loose on the screw 10 to permit the passage of the head 21, and to complete the connection of the keeper by hooking the cradle arm 22 into the slot 37 thereof, the two actions just described being facilitated by the inward curvature 42 and 43 of the keeper legs. Now the pipe requires no further manual support, as it is firmly supported by the hanger. However, the nut 15 may still be adjusted to raise or lower the hanger to a height consistent with the proper level at which the pipe is to be supported; and the final step, turning the lug 39 down on the hook 24 locks the latter against a rising movement to disengage the cradle from the keeper. Ordinarily, it may be assumed that the weight of the pipe will keep the hanger in the engage position; however, the lug 39 forms a safeguard in case the pipe should receive a jar blow or impact tending to raise the cradle 13, in which event the lug 39 acts as an abutment to prevent the rise of the keeper to a point where it may become disengaged. Moreover, the pipe can at no time fall even in the extremely improbable event that the hook 24 should become disengaged, as the head 21 of the cradle would still hold the latter to the keeper and retain the pipe.

The task of applying the hanger is a comparatively easy one in contrast with old methods of supporting pipes from ceilings. Usually, the workman must stand on a ladder and hold the pipe while he connects and adjusts the hanger thereto. With the elimination of bolts or other special fastening means which are tedious and more or less difficult to apply, it is an easy matter to first secure the keeper for its own support, and then attend purely to the linking and hooking of the pipe bearing cradle to the keeper to relieve the workman of manual supporting the pipe. When this is done, the height of the hanger may be quickly adjusted and the lug 39 swung down to lock the hanger.

In conclusion, it is apparent that the novel hanger is made only in two major parts, these being of heavy strap metal calculated to be amply strong for the permanent support of the pipe. Also, the parts of the hanger are simple and capable of being produced at reasonable cost.

While I have described the invention along specific lines, various minor changes or refinements may be made therein without departing from its principle, and I reserve the right to employ all such changes and refinements as may come within the scope and spirit of the appended claims.

I claim:

1. A pipe hanger comprising an upper member adapted to be mounted upon a support and turned about the same to adjusted positions and having depending arms, a lower member having a portion for engaging under a pipe in supporting relation thereto and arms extending upwardly from its pipe-supporting portion and companion to the arms of the upper member, one arm of the upper member being formed with a longitudinally extending slot, the companion arm of the lower member being formed with an upwardly extending neck passed through the slot and having a head at its upper end projecting from opposite side edges of the neck, the head being of a thickness adapting it to be passed through the slot when the upper member is turned about the support from a position transversely of the pipe towards a position longitudinally thereof and dispose the neck through the slot, the head being of a width greater than the slot and having its side portions which project from the neck overlapping the portions of the slotted arm at opposite sides of the slot therein and thereby preventing movement of the neck and the head out of the slot when the head is disposed transversely of the slot, and means for detachably connecting the second arm of the lower member with the companion arm of the upper member and preventing accidental separation thereof.

2. A pipe hanger comprising an upper member adapted to be mounted upon a support and turned about the same to adjusted positions and having depending arms, a lower member having a portion for engaging under a pipe in supporting relation thereto and arms extending upwardly from its pipe-supporting portion and companion to the arms of the upper member, the arms of the upper member being formed with longitudinally extending slots, one of the companion arms of the lower member having interlocking engagement with an upper arm and the other companion arm having its upper portion formed with a hook having a downwardly extending bill passed through the slot and resting upon the portion of the said upper arm at the lower end of the slot therein, and a latch plate pivoted to the said slotted arm above the slot therein for swinging movement transversely thereof into and out of a position in which the lower end of the plate bears against the hood and prevents dislodgement of the hook from the slot.

JOHN A. LAND.

REFERENCES CITED

The following references are of record in the file of this patent:

UNITED STATES PATENTS

| Number | Name | Date |
|---|---|---|
| 706,903 | Crawford | Aug. 12, 1902 |
| 948,902 | Noyes | Feb. 8, 1910 |
| 1,450,640 | Norman | Apr. 3, 1923 |
| 1,904,315 | Kenway | Apr. 18, 1933 |
| 2,158,802 | Redlon | May 16, 1939 |